United States Patent [19]
Fukami et al.

[11] Patent Number: 4,799,221
[45] Date of Patent: Jan. 17, 1989

[54] APPARATUS FOR REPRODUCING A DIGITAL SIGNAL

[75] Inventors: Tadashi Fukami; Shinya Ozaki, both of Kanagawa; Kentaro Odaka, Tokyo, all of Japan

[73] Assignee: Sony Corporation, Tokyo, Japan

[21] Appl. No.: 21,226

[22] Filed: Mar. 3, 1987

[30] Foreign Application Priority Data

Mar. 4, 1986 [JP] Japan .................................. 61-46958
Mar. 7, 1986 [JP] Japan .................................. 61-49744

[51] Int. Cl.⁴ .......................................... G06F 11/10
[52] U.S. Cl. ........................................ 371/38; 360/53
[58] Field of Search ............. 371/38, 39, 40; 360/32, 360/53

[56] References Cited

U.S. PATENT DOCUMENTS

| | | | |
|---|---|---|---|
| 4,446,490 | 5/1984 | Hoshimi et al. | 360/32 |
| 4,523,237 | 6/1985 | Fukuda et al. | 360/8 |
| 4,604,657 | 8/1986 | Fukami et al. | 360/32 |
| 4,622,600 | 11/1986 | Okamoto et al. | 360/32 |
| 4,628,373 | 12/1986 | Takahashi et al. | 360/32 |
| 4,641,208 | 2/1987 | Inazawa et al. | 360/72.2 |

Primary Examiner—Charles E. Atkinson
Attorney, Agent, or Firm—Philip M. Shaw, Jr.

[57] ABSTRACT

The invention relates to a digital signal reproducing apparatus to which continuous blocks of input data are supplied, each block consisting of a PCM signal which was error correction coded and additional codes which were subjected to error detection or error correction coding processes. The error pointers are set independently of the result of the error correction of the PCM signal on the basis of the decoding state of the decoder for decoding the additional codes using the error detection code or error correction code.

7 Claims, 8 Drawing Sheets

Fig. 7A LRCK
Fig. 7B A/Bid
Fig. 7C
Fig. 7D

APPARATUS FOR REPRODUCING A DIGITAL SIGNAL

FIELD OF THE INVENTION

The present invention relates to an apparatus for reproducing a recorded digital signal and, more particularly, to an apparatus for reproducing a recorded digital signal which was originally derived by digitizing an analog signal.

DESCRIPTIO,N OF THE RELATED BACKGROUND ART

A digital tape recorder for recording and reproducing digital audio signals (referred to as PCM signals) by a pair of rotary heads is disclosed in, for example, U.S. Pat. No. 4,523,237 by the same applicant as the present invention. In such a digital tape recorder, sub codes such as the program number, the time code, and the like are recorded. In addition, PCM-IDs for identifying the sampling frequency, the number of channels, and the number or digitization bits of the PCM signal, the presence or absence of preemphasis, the characteristic thereof, and the like are recorded together with the PCM signal. In that apparatus, an error correction code is used such that the PCM signals of the amount to be recorded and reproduced by one rotary head are arranged in a matrix form, an error correction coding process $C_1$ is performed for each PCM signal arranged in the vertical direction of the matrix arrangement, and an error correction coding process $C_2$ is executed for each PCM signal arranged in the lateral direction of the matrix arrangement. The PCM signal which was subjected to an error correction coding process and the vertically arranged check symbol of the error correction code $C_1$ are recorded and reproduced as a unit. Similarly, the PCM signal which was subjected to an error correction coding process and the laterally arranged check symbol of the error correction code $C_2$ are also recorded and reproduced as a unit. To error correct the reproduced signal, decoding of the error correction code $C_1$ ($C_1$ decoding) is performed and the decoding of the error correction code $C_2$ ($C_2$ decoding) is then executed.

In order to easily interpolate the error symbols if uncorrectable errors occur, the even number designated data and the odd number designated data of the PCM signal are separately recorded in two adjacent tracks. With a pair of rotary magnetic heads, A an B in the case of the stereophonic PCM signals, the even number designated data Le of the L (left) channel and the odd number designated data Ro of the R (right) channel are recorded on the magnetic tape by the magnetic head A, and the odd number designated data Lo of the L channel and the even number designated data Re of the R channel are recorded on the magnetic tape by the magnetic head B. A pair of tracks formed by the respective magnetic heads in this manner are called an interleave pair. The data to be recorded in the tracks of the interleave pair have the same frame address in an additional code. Therefore, during reproduction, the interleave pair can be identified from the frame address. The reproduced data is subjected to the above described error correcting processes. The error corrected respective reproduced data of the interleave pair is synthesized and converted into the PCM signal.

A recording method wherein no guard band is provided between the tracks is used in order to raise the use efficiency of the magnetic tape. Namely, the lengthwise direction of the gap of the magnetic head A is different from that of the magnetic head B, thereby using azimuth loss to suppress the cross talk from the adjacent tracks.

As used herein, the term "PCM" signal (or signals) refers to the pulse code modulated audio signals which are to be recorded or reproduced; "block" of data refers to a unit amount of the recording data, in this embodiment 288 bits and may comprise PCM data, referred to as a "PCM data block" or sub code data, referred to as a "sub code data block"; and "symbol" which is eight bits. In order to keep track of the frames and blocks, addresses are assigned to them, e.g. a "frame address" refers to the address which identifies an interleave pair of tracks; a "block address" uniquely identifies a block of data.

As will be explained in further detail herein, in the foregoing rotary head type digital tape recorder, an error detection code using a simple parity is applied separately from the PCM signal to additional codes, such as a block address, to write blocks of the reproduced data into a buffer memory, the frame address indicative of the interleave pair, and the like, as will be explained in greater detail further in this specification in reference to the constitution of the data for the digital tape recorder. However, such an error detection code has the following drawbacks. Namely, the reliability of the result of the error detection is low. If an erroneous block address is reproduced, the reproduced data is written into the wrong block address. If an erroneous frame address is reproduced, the interleave pair are formed from unrelated data. Thus, there is the possibility that an annoying, abnormal sound can occur in the reproduced sound. Even if tee $C_1$ and $C_2$ decoding processes are performed using the error correction codes of the PCM signal, the occurrence of abnormal sounds cannot be completely prevented.

To overcome this problem, the same applicant of the present invention has previously proposed an apparatus for interpolating the error data if the frame addresses differ when one track is being traced. This apparatus is shown in U.S. Pat. No. 4,604,657 (European Patent Application No. 0,163,736 published on Dec. 11, 1985).

A rotary head type digital tape recorder can perform a variable speed reproducing operation in which the tape running speed is two or three or more times as fast as the recording mode tape speed. In a double speed reproducing mode or in a triple speed reproducing mode, in the case where the track TA recorded by the magnetic head A is scanned by the magnetic head B or where the track TB recorded by the magnetic head B is scanned by the magnetic head A, a reproduced signal can hardly be obtained because of the azimuth loss. The problem barely occurs if the reproduced signal of one of two tracks which were erroneously detected as the interleave pair can be sufficiently suppressed by the azimuth loss. However, even when the azimuths are not coincident due to tracking error, if the reproduced signal is obtained, or if the azimuths concerned with the reproduced signals from two tracks which were erroneously detected as the interleave pair coincide, a signal is reproduced in which PCM signals which are unconcerned with each other are alternately included with every reproduced digital word. Thus, there is the problem that annoying, abnormal sounds are reproduced.

SUMMARY OF THE INVENTION

It is an object of the present invention to provide an improved apparatus for reproducing a digital signal.

Another object of the invention is to provide an improved apparatus for reproducing a digital signal having interpolating means for correcting the erroneous digital signal.

These objects are accomplished by an apparatus for reproducing a digital signal from input data made up of continuous blocks, each block consisting of a PCM signal which was error correction coded and additional codes which were error detection coded or error correction coded. The apparatus comprises: error correcting means for error correcting the PCM signal using the error correction code and outputting the error corrected PCM signal; decoding means for decoding the additional codes using the error detection code or the error correction code; interpolating means which is supplied with output of the error correcting means; and deciding means for setting an error pointer to data which is supplied to the interpolating circuit in accordance with the decoding state of the decoding means independently of the result of the correction by the error correcting means.

The above and other objects and features of the present invention will become apparent from the following detailed description and the appended claims with reference to the accompanying drawings.

DESCRIPTION OF THE PREFERRED EMBODIMENTS

Figure 1:
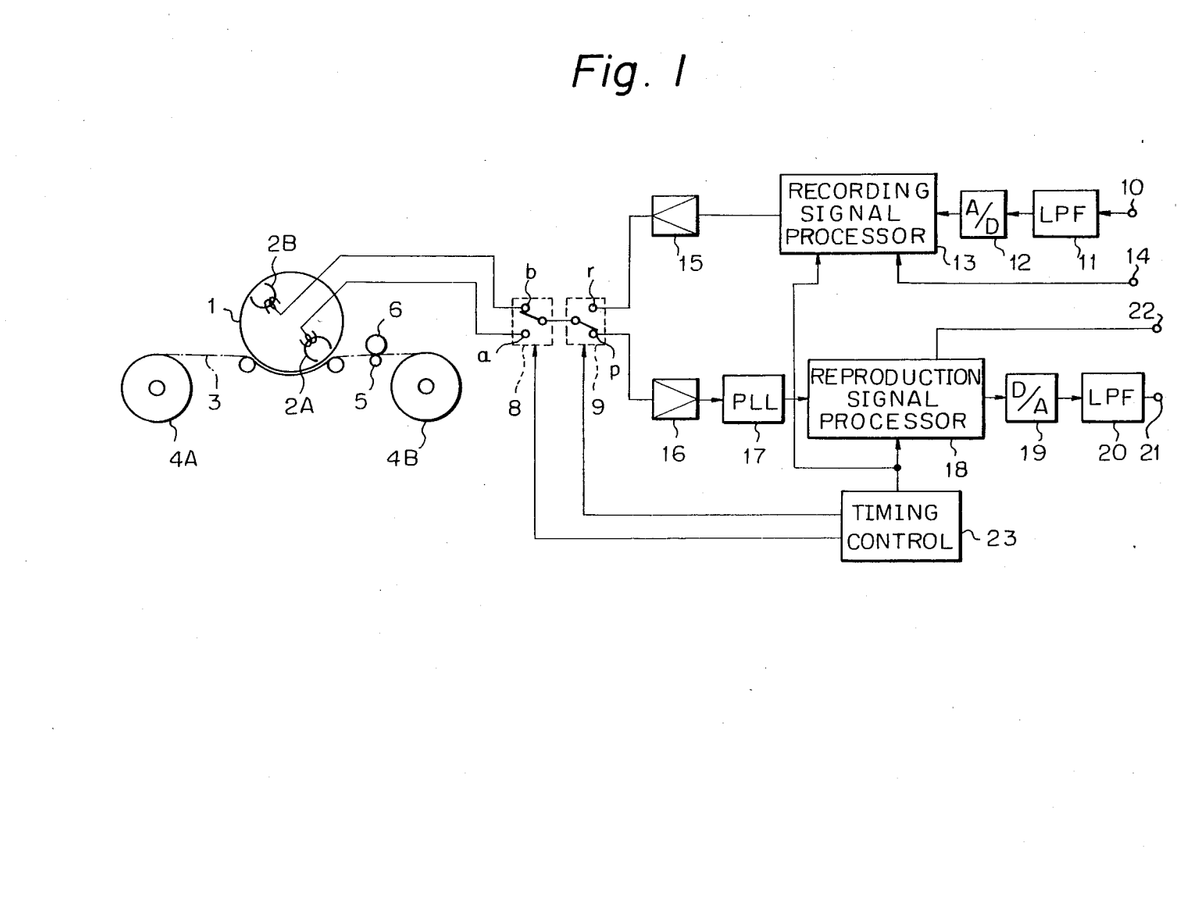
FIG. 1 is a block diagram showing an overall constitution of a rotary head type digital tape recorder to which the invention can be applied.

An embodiment in the case of applying the present invention to a rotary head type digital tape recorder (hereinafter, abbreviated to an R-DAT) will be described hereinbelow with reference to the drawings in accordance with the following order.

a. Overall constitution of the digital tape recorder;
b. Data constitution of the digital tape recorder;
c. Error correction codes ofthe digital tape recorder;
d. Reproduction signal processor;
e. Frame address deciding circuit; and
f. Control of the interpolating operation and error correcting operation.

a. Overall constitution of the digital tape recorder:

FIG. 1 shows an overall constitution of the rotary head type digital tape recorder (i.e., RDAT). In the diagram, reference numeral 1 denotes a drum having a diameter of 30 mm which is rotated at a speed of 2000 r.p.m. A pair of magnetic heads 2A and 2B are attached to the drum 1 with an angular interval of 180°. A magnetic tape 3 (indicated by an alternate long and short dash line) is obliquely wound around the peripheral surface of the drum 1 at a wrap angle of 90°. The magnetic tape 3 is laid between reel hubs 4A and 4B of a tape cassette and is moved at a speed of 8.15 mm/sec by a capstan 5 and a pinch roller 6.

Figure 2:
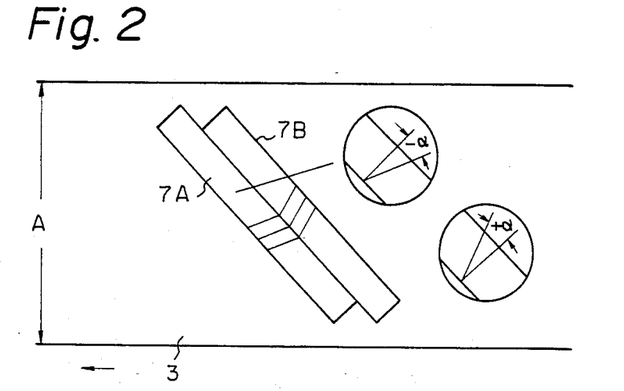
FIG. 2 is a schematic diagram showing a tape format of the digital tape recorder.

As the drum 1 is rotated, the magnetic heads 2A and 2B alternately come into contact with the magnetic tape 3, thereby forming oblique tracks 7A and 7B onto the magnetic tape 3 as shown in FIG. 2. A tape width A of the magnetic tape 3 is 3.81 mm. The magnetic gap of the rotary head 2A is inclined by an angle of inclination of $+\alpha$ with respect to the direction perpendicular to the track. The magnetic gap of the other rotary head 2B is inclined by an angle of inclination of $-\alpha$ with regard to the direction perpendicular to the track. The value of $\alpha$ is set to 20°. The angles of the magnetic gaps of the magnetic heads 2A and 2B are called + azimuth and − azimuth, respectively.

The magnetic heads 2A and 2B are alternately selected by a head change-over switch 8. The recording signal from a terminal r of a recording/reproducing switch 9 is supplied to the magnetic heads 2A and 2B through rotary transformers (not shown). The reproduced signals of the magnetic heads 2A and 2B are taken out to a terminal p of the switch 9 through the rotary transformers (not shown).

The analog audio signal from an input terminal 10 is supplied to an A/D converter 12 through a low pass filter 11 and converted into a digital audio signal (at a sampling frequency of 48 kHz on the basis of a linear digitization of 16 bits). The digital audio signal from the A/D converter 12 is supplied to a recording signal processor 13. In the processor 13, the digital audio signal is subjected to an error correction coding process and converted into the format of the recording data, which will be explained hereinafter. In this case, an ID signal (PCM-ID) to identify the on/off of the preemphasis of the signal to be recorded, the sampling frequency, the number of digitization bits, and the like is added. The ub codes such as the program number, the time code, and the like of the signal to be recorded, and an ID signal (sub code ID) for the sub codes are formed by a sub code encoder (not shown) and supplied from a terminal 14 to the recording signal processor 13.

Serial recording data for each track is generated from the processor 13 synchronously with the rotation of the magnetic heads 2A and 2B. The recording data is supplied to the head change-over switch 8 through a recording amplifier 15 and the terminal r of the recording/reproducing switch 9. The recording data is alternately supplied to the magnetic heads 2A and 2B by the switch 8.

During reproduction, the signals reproduced by the magnetic heads 2A and 2B are supplied to a reproducing amplifier 16 through the switch 8 and through a terminal p of the switch 9. The output signal of the reproducing amplifier 16 is supplied to a phase locked loop (PLL) 17. In the PLL 17, the clock signal synchronized with the reproduced signal is extracted. In a reproduction signal processor 18, the reproduced signal from the PLL 17 is subjected to the processes of error correction, interpolation, and the like. The reproduced digital audio signal is supplied to a D/A converter 19. The reproduced audio signal from the D/A converter 19 is taken out to an output terminal 21 through a low pass filter 20. Further, the sub codes and sub oode ID are separated by the reproduction signal processor 18 and taken out to an output terminal 22. A sub code decoder (not shown) is connected to the output terminal 22 and control data and the like are formed from the sub codes.

Figure 3A:
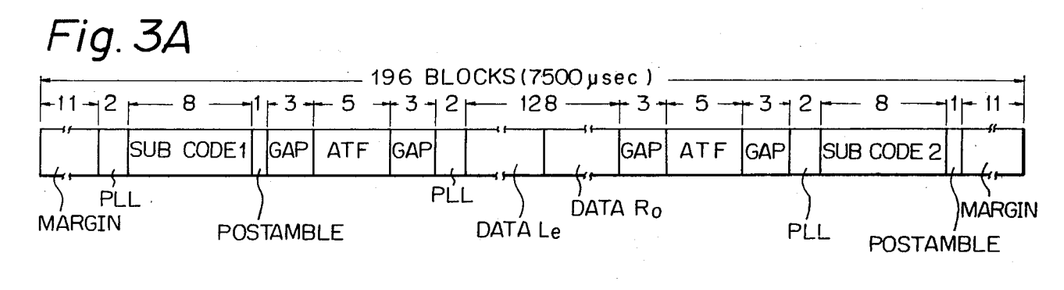
FIGS. 3A to 3E are schematic diagrams for explaining a track format and a block format of the digital tape recorder.

Control signals to control the head change-over switch 8 and recording/reproducing change-over switch 9 are formed by a timing controller 23 from a PG pulse indicative of the rotation of the heads. In addition, the timing controller 23 generates clock signals and timing signals which are respectively necessary for the recording signal processor 13 and reproduction signal processor 18 using the clock signal, block sync signal, and the like from the PLL 17.

b. Data constitution of the digital tape recorder:

The whole part of the data to be recorded in a single track is called one segment. FIG. 3A shows the constitution of the data of one segment which is recorded by one rotary magnetic head. Assuming that a unit amount of the recording data, whether it be PCM data or sub code data, is one block, the data of 196 blocks (7500 μsec) is included in one segment. The constitution of the PCM data blocks and the sub code data blocks will be given in detail further herein in reference to FIGS. 3B and 3C. Margins (eleven blocks) are provided in both end portions of one segment corresponding to the edge portions of the track, respectively. A sub code 1 and a sub code 2 are recorded in the portions adjacent to those margins, respectively. These two sub codes are the same data and this data is recorded twice. The sub code includes the program number and time code. A run-in interval (two blocks) of the PLL and a postamble interval (one block) are arranged on both sides of the recording area of eight blocks of each sub code.

Several inter block gaps (GAP) in which no data is recorded for three blocks are also provided. A pilot signal for the ATF is recorded in five blocks between the 3-block inter block gaps. The PCM signal which was subjected to the recording process is recorded in an area having a length of 128 blocks, i.e. excluding the run-in interval of the PLL of two blocks within an area having a length of 130 blocks of the central portion of one segment and between inter block gaps (GAP). This recorded PCM signal is the data corresponding to the audio signal for the period of time when the rotary head rotates by only the amount corresponding to a half rotation of the drum 1.

The recorded PCM signal consists of the two-channel stereophonic PCM signals of right (R) and left (L) channels and the parity data of the error detection/correction codes. When one segment as shown in FIG. 3A is recorded and reproduced by the magnetic head 2A, the data Le is recorded in the left half portion of the PCM signal recording area and the data Ro is recorded in the right half portion. The data Le consists of the even-number designated data of the L channel and the parity data regarding this data. The data Ro consists of the odd-number designated data of the R channel and the parity data concerned with this data. The odd number and even number are the order numbers when they are counted from the beginning of the interleave block.

The data of one segment is recorded in another track which is formed by the other rotary magnetic head so as to have the same constitution as that of the above described track except that the data Re is recorded in the left half portion of the data interval in the data of one segment in the other track, and the data Lo is recorded in the right half portion. The data Re consists of the even-number designated data of the R channel and the parity data regarding this data. The data Lo consists of the odd-number designated data of the L channel and the parity data with respect to this data. In this manner, the even-number designated data and odd-number designated data of each channel are recorded in two adjacent tracks and at the same time, the data of the L and R channels is recorded in the same track. The reason why the data is recorded in this way is to prevent the possibility that continuous data of the same channel might become error data due to dropout of the signal and the like.

Figures 3B, 3C, 3D, 3E:
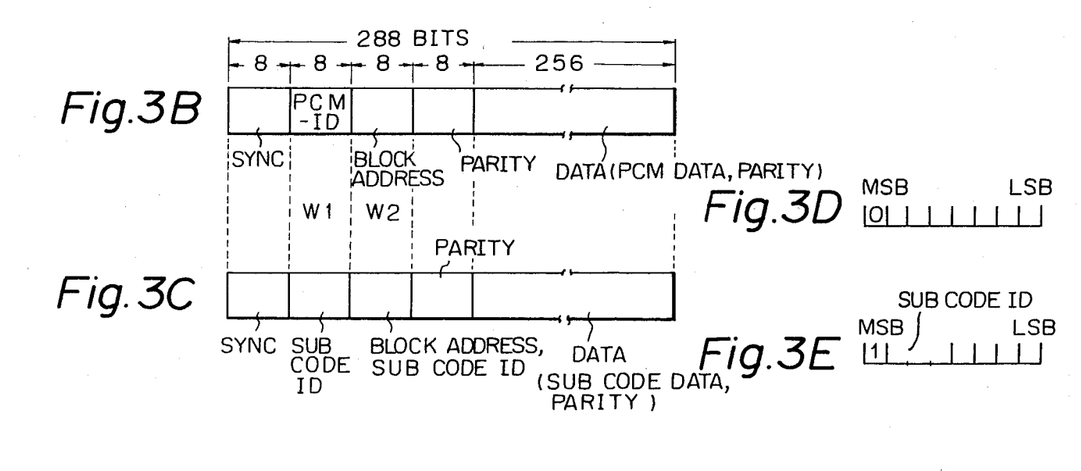

FIG. 3B shows the data constitution of one block of the PCM signal. A block sync signal of eight bits (one symbol) is added to the head of each block. Then, a PCM-ID of eight bits is added. After the PCM-ID, a block address is added. A simple parity error correction coding process is performed with respect to two symbols (WI and W2) of the PCM-ID and block address and an eight-bit parity is added after the block address. As shown in FIG. 3D, the block address is constituted by seven bits excluding the most significant bit (MSB). When the MSB is set to "0", this means that this block is the PCM block.

The block address of seven bits sequentially changes such as (00) to (7F) (hexadecimal notation). The PCM-ID which is recorded in each of the blocks having block addresses whose lower three bits are (000), (010), (100), and (110) is predetermined. The optional code of the PCM-ID can be recorded as each of the block addresses in which the lower three its are (001), (011), (101), and (111). The PCM-ID includes $ID_1$ to $ID_8$ each consisting of two bits and the frame address of four bits. The identification information is defined for each of $ID_1$ to $ID_7$. One pack is constituted by thirty-two $ID_8$. For example, the $ID_1$ is the format ID. The kind of application is identified by the $ID_1$ to designate if it is used for audio or for other purposes. The on/off of the preemphasis and the characteristic thereof are identified by the $ID_2$. The sampling frequency is identified by the $ID_3$. Each of the $ID_1$ to $ID_7$ and the frame address are segments of the interleave pair and are the same data.

FIG. 3C shows a constitution of the data of one block of the sub codes. This data constitution is similar to that of the foregoing PCM block. As shown in FIG. 3E, the MSB (most significant bit) of the symbol $W_2$ of the sub code block is "1" and this means that the block is a sub code block. The lower four bits of the symbol $W_2$ are used as the block address. Eight bits of the symbol $W_1$ and three bits in the symbol $W_2$ excluding the MSB and the block address are used as the sub code ID. With respect to two symbols ($W_1$ and $W_2$) of the sub code block, a simple parity error correction coding process is performed and a parity of eight bits is added.

Figure 4A:
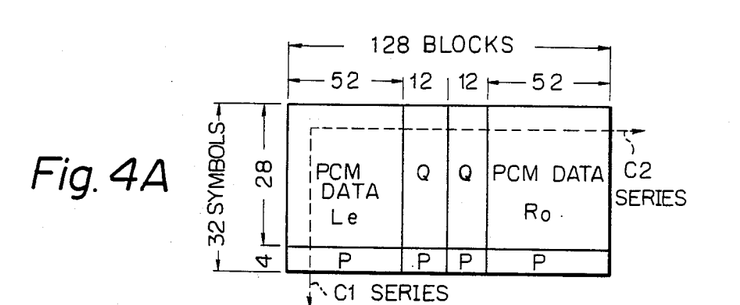
FIGS. 4A and 4B are schematic diagrams for explaining error correction codes of the digital tape recorder.
Figure 4B:
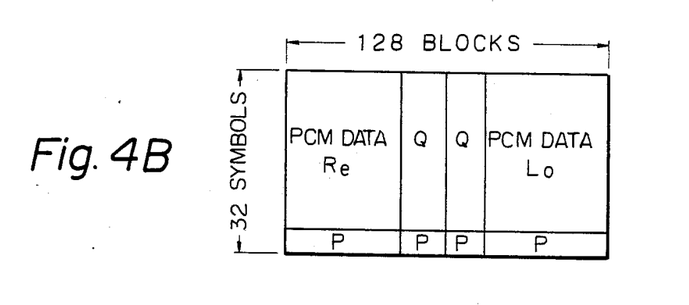

The different data is recorded as the sub code ID in the even-number designated block addresses (the LSB (least significant bit) of each block address is "0") and in the odd-number designated block addresses (the LSB of each block address is "1"). The sub code ID includes the control ID to designate the reproducing method, the time code, and the like. The sub code data is subjected to an error correction coding process using a Reed Solomon code in a manner similar to the PCM data.

c. Error correction codes of the digital tape recorder:

The processes of the error detection/correction codes are executed for the data of each one of the 128 blocks to be recorded in one segment. FIG. 4A shows a code constitution of the data to be recorded by the magnetic head 2A. FIG. 4B shows a code constitution of the data to be recorded by the other magnetic head 2B. The PCM signal in which the number of digitization bits is sixteen is divided into an upper eight bits and a lower eight bits, and the coding processes of the error detection/correction codes are performed in a manner such that eight bits are used as one symbol.

The data of 4096 ($=128 \times 32$) symbols is recorded in one segment. As shown in FIG. 4A, the $C_1$ and $C_2$ error correction coding processes are executed with respect to each of the vertical and horizontal directions of the two-dimensional arrangement of the data consisting of the even-number designated data Le of the L channel comprising the symbols of ($L_0, L_2, \ldots, L_{1438}$) and the odd-number designated data Ro of the R channel comprising the symbols of ($R_1, R_3, \ldots, R_{1439}$) A $C_1$ coding process using a Reed Solomon code of (32, 28, 5) is performed with regard to the twenty-eight symbols in the vertical direction. The parity data P of four symbols of the $C_1$ code is arranged at the last position of the two-dimensional arrangement. A $C_2$ coding process using a Reed Solomon code of (32, 26, 7) is performed with regard to the fifty-two symbols in the horizontal direction. The $C_2$ coding process is performed on every symbol pair among the 52 symbols, i.e. on 26 symbols. The parity data Q consisting of six symbols is generated with respect to one code series. The parity data Q consisting of a total of twelve symbols of the $C_2$ code is arranged in the central portion of the two-dimensional arrangement. Similarly, the $C_2$ coding process is also executed with regard to the symbols of the other 52 PCM data in the horizontal direction and the parity data Q is arranged in the central portion.

The code constitution shown in FIG. 4B is obtained by replacing the even-number designated PCM signals of the L channel in the code constitution shown in FIG. 4A by the even-number designated PCM signals ($R_0, R_2, \ldots, R_{1438}$) of the R channel and by replacing the odd-number designated PCM signals of the R channel by the odd-number designated PCM signals ($L_1, L_3, \ldots, L_{1439}$) of the L channel.

Figure 5:
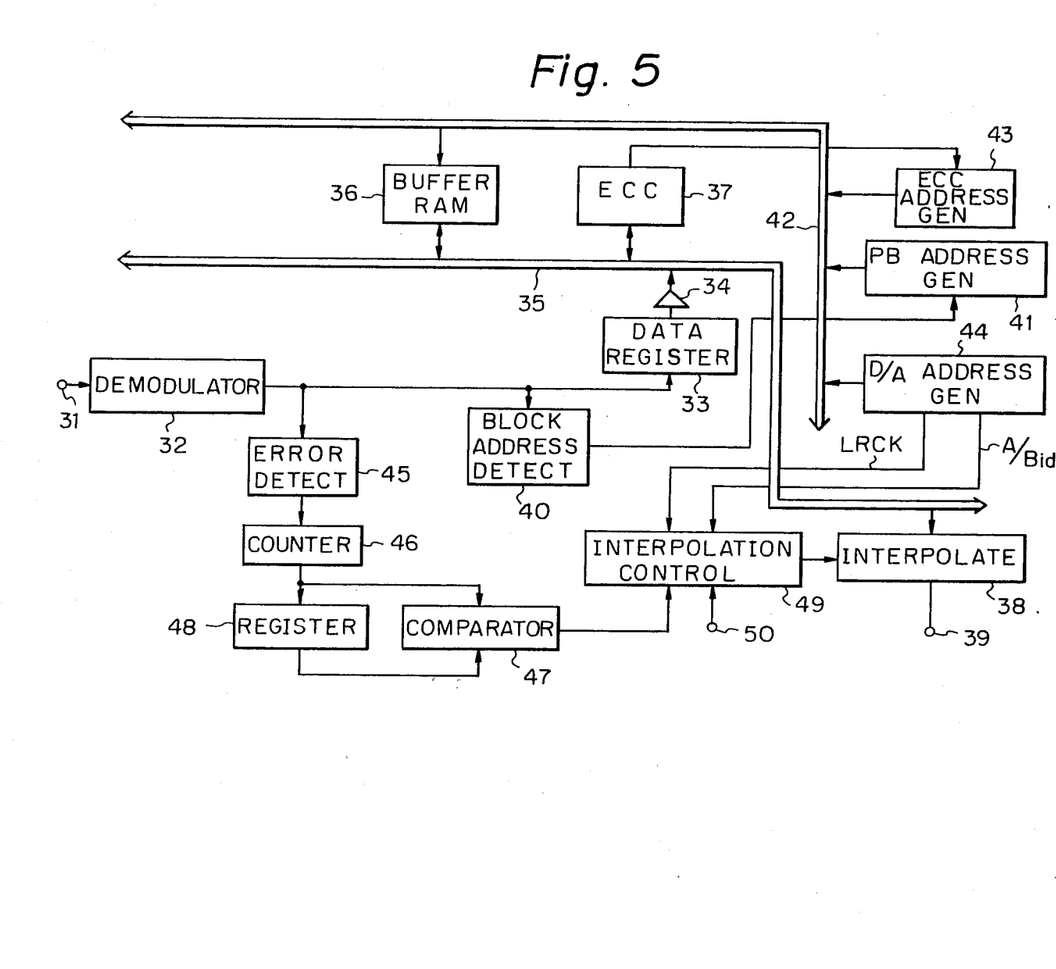
FIG. 5 is a block diagram showing the main section of a first embodiment of the invention.

As shown in FIG. 3B, one PCM block is constituted by adding the sync signal, PCM-ID, block address, and parity to the 32 symbols arranged in the vertical direction in those code constitutions.

d. Reproduction signal processor:

The invention is applied to the processes carried out by the reproduction signal processor 18 of the foregoing rotary head type digital tape recorder during a variable speed reproducing mode. FIG. 5 shows a block diagram of the constitution of the reproduction signal processor 18.

In overview, the reproduced data is written into a buffer memory 36 in accordance with a block address in the reproduced data for each symbl of the data. When a certain amount of reproduced data is written, the data which has already been written is read out in parallel with the writing operation. $C_1$ decoding is performed with respect to the data read out. The PCM signal which was error corrected by the $C_1$ decoding is written into the buffer memory 36 and at the same time, a pointer ($C_1$ pointer) generated by the $C_1$ decoding is written into the buffer memory 36. After completion of the $C_1$ decoding, the check symbols (parity data P) of the code $C_1$ in the reproduced data are no longer necessary data. Therefore, the pointer in the $C_1$ decoding is written into the area in the buffer memory 36 where the parity data P was stored. After the $C_1$ decoding is performed, $C_2$ decoding is executed using the PCM signals, the check symbols (parity data Q) of the code $C_2$, and the $C_1$ pointer which are stored in the buffer memory 36. The decoded data, after deinterleaving and interpolation is supplied to a D/A convertor to produce an analog signal.

The details of FIG. 5 will now be described. The reproduced signal is supplied to an input terminal 31 from the phase locked loop 17 (FIG. 1). From the terminal 31 the reproduced signal is supplied to a demodulator 32 and one symbol and ten bits are demodulated into one symbol and eight bits. When recording the data on the magnetic tape 3, eight bits of one symbol are subjected to the digital modulating process so as to be converted into a preferable ten-bit pattern in order to reduce the low frequency component as little as possible. Each symbol of the reproduced data from the demodulator 32 is supplied to a data bus 35 through a data register 33 and a buffer 34.

A buffer RAM 36 and an error correcting circuit 37 are connected to the data bus 35. As will be explained in further detail hereinafter, the reproduced data is stored into the buffer RAM 36 from the data bus 35. This stored data is supplied to the error correcting circuit 37, on command, via the data bus 35. In the error correcting circuit 37, the data stored in the buffer RAM 36 is subjected, successively, to the error correcting processes ($C_1$ decoding and $C_2$ decoding) by use of Reed Solomon codes. The PCM signals of the tracks A and B after the $C_1$ and $C_2$ decoding processes are finished are read out of the buffer RAM 36 in accordance with the original order. In this case, the two-channel stereophonic signals are formed by the PCM signals which were respectively reproduced from the tracks A and B and error corrected. The PCM signal read out of the buffer RAM 36 is supplied to the interpolating circuit 38 via the data bus 35.

In the interpolating circuit 38, the uncorrectable errors are interpolated by any of several known ways, such as mean value interpolation (primary interpolation), nth-order interpolation or 0th-order interpolation (holding of the previous value). The reproduced PCM signal is taken out to an output terminal 39 connected to the interpolating circuit 38. The reproduced PCM signal is supplied from the output terminal 39 to the D/A converter 19 (refer to FIG. 1). The sub codes are subjected to the error correction processes and the like by a sub code decoder (not shown) and taken out to an output terminal 22 (refer to FIG. 1) of the sub code decoder (not shown).

A block address detecting circuit 40 is provided in conjunction with the demodulator 32. During reproduction of the recorded signal, a reproduced block address is read by the block address detecting circuit 40. The reproduced block address is supplied to a reproduction address generator 41. The reproduction address generated by the reproduction address generator 41 is supplied to an address bus 42. The reproduction address derived through the address bus 42 is used as the address signal of the buffer RAM 36. The reproduction block address is used to write the reproduced data of (32 symbols ×128 blocks) (refer to FIGS. 4A and 4B) of one segment for every block in the order from the first block to the 128th block.

Numeral 43 denotes an address generator for the ECC (error correcting circuit). The address formed by the ECC address generator 43 is supplied to the buffer RAM 36 through the address bus 42. The ECC address is used to read out the data from the buffer RAM 36 for the respective $C_1$ and $C_2$ decoding processes and to write the error corrected data and the pointer into the buffer RAM 36.

Upon $C_1$ decoding, the data (PCM signal and parity data P) of the $C_1$ series which has previously been written at the reproduction address is read out of the buffer RAM 36 block by block and error corrected by the error correcting circuit 37. The corrected PCM signal and the $C_1$ pointer are written into the same block address in the buffer RAM 36. The $C_1$ pointer is written into the memory area in which the parity P has already been written. The error correcting process is performed with respect to all of the $C_1$ series. The ECC address generator 43 generates the read address and write address in the $C_1$ decoding mentioned above. Upon $C_2$ decoding, the $C_1$ decoded PCM signal, $C_1$ pointer, and parity data Q are read for every $C_2$ series and subjected to the $C_2$ decoding process in the error correcting circuit 37. The PCM signal which was error corrected by the $C_2$ decoding and the $C_2$ pointer are written back into the buffer RAM 36. In this $C_2$ decoding, the necessary read address and write address are formed by the ECC address generator 43.

The PCM signals which were subjected to the $C_1$ and $C_2$ decoding processes are read out of the buffer RAM 36 in accordance with the original order. In this case, the stereophonic signals of two channels are formed by the PCM signals which had been reproduced from the tracks TA and TB of the interleave pair and which were error corrected. A D/A address generator 44 is provided to read out the error corrected PCM signal from the buffer RAM 36. The digital address formed by the D/A address generator 44 is supplied to the buffer RAM 36 through the address bus 42. The PCM signal read out of the buffer RAM 36 is supplied to the interpolating circuit 38.

The PCM-ID or sub code ID ($W_1$) which is derived from the demodulator 32' the block address ($W_2$), and the parity are supplied to an error detecting circuit 45 and subjected to error detection using a simple parity by the error detecting circuit 45. An error pulse indicative of the presence or absence of errors is generated from the error detecting circuit 45. The error pulse is set to "1" when an error is detected and "0" when no error is detected. The error pulse is supplied to a counter 46. The counter 46 counts the "0" error pulses with respect to the reproduced data of one segment.

The count value of the counter 46 is supplied to a comparator 47 and a register 48. The count value of the counter 46 regarding the reproduced data of one segment produced by the magnetic head 2A is stored into the register 48. The count value of the counter 46 with respect to the reproduced data of one segment reproduced by the magnetic head 2B is then compared with the count value of the register 48 by the comparator 47. Thus, the comparator 47 generates a comparison output signal of one bit corresponding to the magniude of the count value. The comparison output signal is supplied to an interpolation control circuit 49. A reproducing mode decision signal is supplied from an external source to the interpolation control circuit 49 from a terminal 50. The D/A address generator 44 generates a timing signal LRCK indicative of the output of the L or R channel and a signal A/$B_{id}$ indicative of the reproduced signal by the head 2A or 2B. The signals LRCK and A/$B_{id}$ are supplied to the interpolation control circuit 49.

The interpolation control circuit 49 generates an interpolation control signal to the interpolating circuit 38. The interpolating circuit 38 performs an interpolation using mean value interpolation, previous value holdig, or the like with respect to the words of the PCM signal whose errors cannot be corrected and which are specified by the pointer in the PCM signal which was subjected to the error correcting process. The interpolating operation is forcibly performed with regard to the PCM signal when the interpolation control signal from the interpolation control circuit 49 is set to, e.g., "1". Namely, between the reproduced data from the magnetic head 2A and the reproduced data from the magnetic head 2B, the reproduced data whose error state is worse, as detected by the comparator 47 when the count in the counter 46 is less than that in the register 48, is interpolated irrespective of the pointer. The interpolation control signal for allowing the interpolating operation to be forcibly performed is formed on the basis of the reproducing mode decision signal only in a high speed reproducing mode such as the double or triple speed reproducing mode. Such high speed modes present special error correction problems, as will now be explained.

Figure 6A:
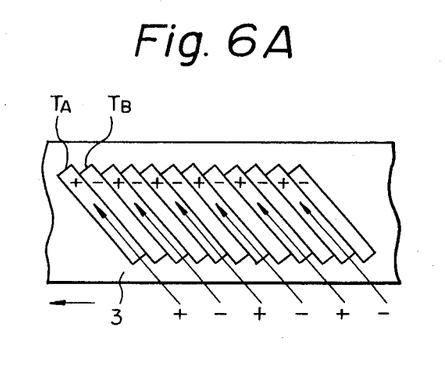
FIGS. 6A and 6B are diagrams for explaining the operations in the double speed reproducing mode and in the triple speed reproducing mode.
Figure 6B:
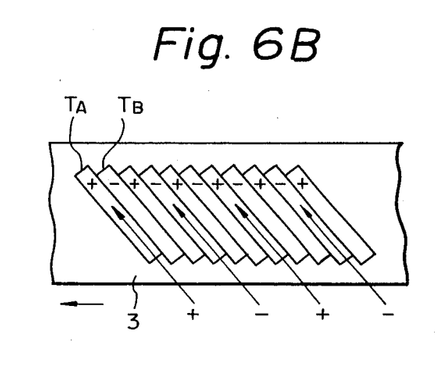

The recording tracks are intermittently reproduced in the variable speed reproducing mode as shown in Figs. 6A and 6B. In FIGS. 6A and 6B, $T_A$ denotes a track formed by the magnetic head A and $T_B$ indicates a track formed by the magnetic head B. The direction (+ azimuth) of the gap of the magnetic head A is shown in the track $T_A$. The direction (− azimuth) of the gap of the magnetic head B is shown in the track $T_B$. Two adjacent tracks $T_A$ and $T_B$ constitute the interleave pair.

In the double speed reproducing mode in which the magnetic tape 3 is moved at twice the recording speed, every other track is scanned as shown by oblique arrows in FIG. 6A. Therefore, there is the problem that the continuous reproduced output signals from the magnetic heads 2A and 2B do not correspond to the reproduced output signals from the interleave pair.

The first and every third track thereafter are scanned as indicated by oblique arrows in FIG. 6B, in the triple speed reproducing mode in which the magnetic tape 3 is moved at three times the recording speed. Thus, similarly to the double speed reproducing mode, the continuous reproduced output signals from the magnetic heads 2A and 2B do not correspond to the reproduced output signals from the interleave pair.

Figures 7A, 7B:
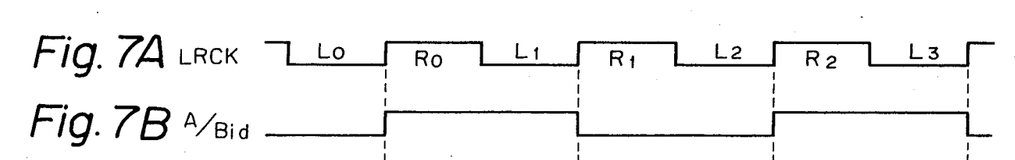
FIGS. 7A and 7D are time charts for explaining the operation of an embodiment of the invention.

The operation of the foregoing embodiment of the invention will now be described with reference to Figs. 7A and 7B which denote the timing signals LRCK and A/$B_{id}$ which are supplied to the interpolating circuit 38 and synchronized with the PCM signal. As shown in FIG. 7A, the timing signal LRCK is synchronized with the data of each channel of the stereophoni signals in the normal reproducing mode. The timing signal A/$B_{id}$ is used to discriminate the reproduced data of the magnetic heads 2A and 2B.

As shown in FIG. 4A, the magnetic head 2A records and reproduces the even number designated data Le of the L channel and the odd number designated data Ro of the R channel. As shown in FIG. 4B, the magnetic head 2B records and reproduces the even number designated data Re of the R channel and the odd number designated data Lo of the L channel. Therefore, the period of time when the timing signal A/B$_{id}$ shown in FIG. 7B, is set to "0" corresponds to the period of time during which data is reproduced by the magnetic head 2A. The period of time when the timing signal A/B$_{id}$ is set to "1" corresponds to the period of time during which data is reproduced by the magnetic head 2B.

Figure 7C:
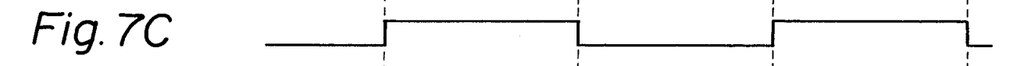
Figure 7D:
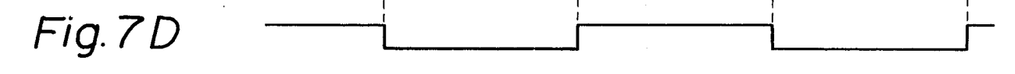

In the high speed reproducing mode, the interpolation control circuit 49 generates the interpolation control signal shown in FIG. 7C or 7D in response to the comparison output signal of the comparator 47. For example, the interpolation control signal shown in FIG. 7C s formed when the comparison output signal of the comparator 47 indicates that the error state of the data reproduced by the magnetic head 2A is better than that of the data reproduced by the magnetic head 2B. Namely, the interpolation control signal is set to "1" for the periods of time of the PCM signals ($R_O$, $L_1$, $R_2$, $L_3$, ...) reproduced by the magnetic head 2B, so that the PCM signals are interpolated. If, however, the error state of the reproduced data of the magnetic head 2B is better than that of the reproduced data of the magnetic head 2A, as shown in FIG. 7D, then an interpolation control signal of "1" is generated for the periods of time during which the PCM signals ($R_1$, $L_2$, $R_3$, $L_4$, ...) are reproduced by the magnetic head 2A. The PCM signals reproduced by the magnetic head 2A are interpolated on the basis of the interpolation control signal.

In another embodiment which is different from the foregoing embodiment, the $C_1$ pointer generated by the $C_1$ decoding may be also used in place of the result of the parity check in order to discriminate the error states of the reproduced data of the magnetic heads 2A and 2B, respectively. The invention can be also applied to the case of constituting the data in such a manner that errors can be detected by the CRC code for every block of the recording data. Further, the error state of the reproduced signal of the magnetic head may also be decided on the basis of the envelope of the reproduced signal fom the magnetic head.

Figure 8:
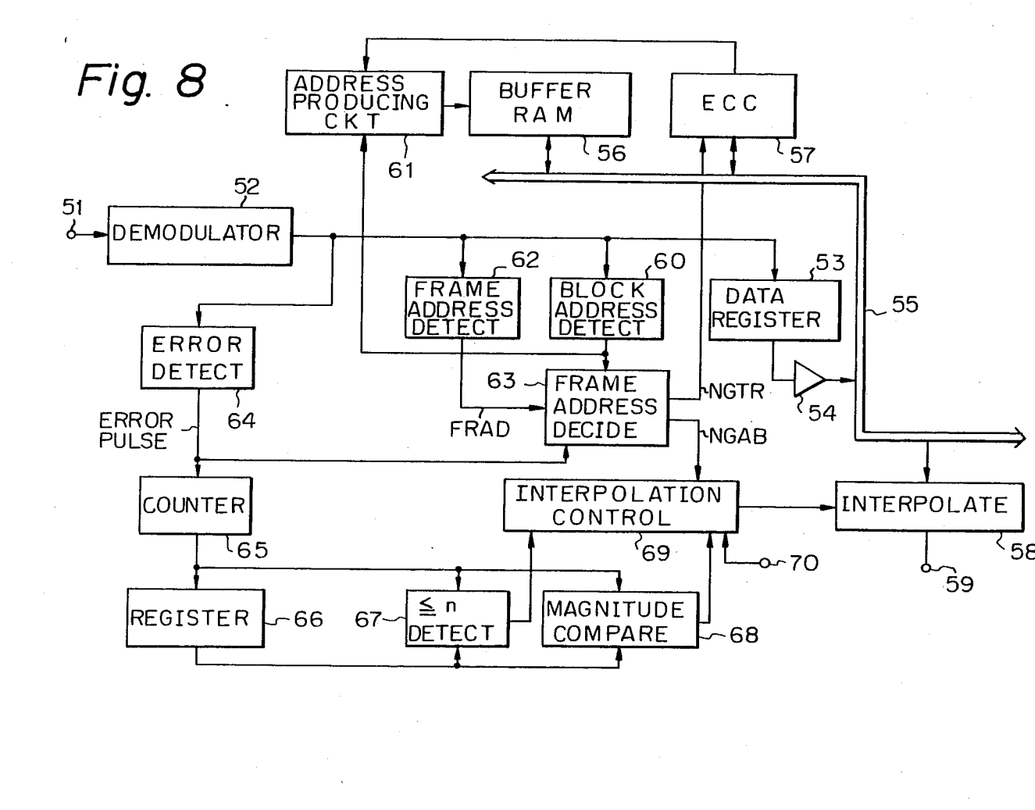
FIG. 8 is a block diagram showing the main section of a second embodiment of the invention.

FIG. 8 shows a constitution of the reproduction signal processor 18 in another embodiment. Similar to the embodiment depicted in FIG. 5, the reproduced signal is supplied to an input terminal shown at 51. The reproduced data from a demodulator 52 is supplied to a data bus 55 symbol by symbol through a data register 53 and a buffer 54.

A buffer RAM 56 and an error correcting circuit 57 are connected to the data bus 55. The reproduced data is written into the buffer RAM 56 from the data bus 55. In the error correcting circuit 57, the data stored in the buffer RAM 56 is subjected to error correcting processes ($C_1$ decoding and $C_2$ decoding) using Reed Solomon codes. The error corrected PCM signal is supplied to an interpolating circuit 58. The uncorrectable errors are interpolated and the reproduced PCM signal is taken out to an output terminal 59. From the output terminal 59, the reproduced PCM signal is supplied to the D/A converter 19 (refer to FIG. 1). The sub codes are subjected to such processes as error correction and the like by a sub code decoder (not shown) and taken out to an output terminal (not shown) of the sub codes.

A block address detecting circuit 60 is provided with respect to the demodulator 52. The reproduced block address is detected by the block address detecting circuit 60. The reproduced block address is supplied to an address producing circuit 61. The reproduction address generated by the address producing circuit 61 is used as the address signal of the buffer RAM 56. The reproduction block address is used to write the reproduced data of one segment (32 symbols × 128 blocks) (refer to FIG. 4) block by block in accordance with the order from the first block to the 128th block.

The address for the ECC (error correcting circuit) is also produced by the address producing circuit 61 The ECC address is supplied to the buffer RAM 56. The ECC address is used to read out the data from the buffer RAM 56 for the $C_1$ and $C_2$ decoding processes, respectively, and to write the error corrected data and the pointer into the buffer RAM 56.

Upon $C_1$ decoding, the data (PCM signal and parity data P) of the $C_1$ series which has previously been written at the reproduction address is read out of the buffer RAM 56 block by block and error corrected by the error correcting circuit 57. The corrected PCM signal and the $C_1$ pointer are written into the same block address in the buffer RAM 56. The $C_1$ pointer is written into the memory area in which the parity P has already been written. The error correcting processes are executed with respect to all of the $C_1$ series. The ECC address producing circuit 61 generates the read address and write address in the $C_1$ decoding mentioned above. Upon $C_2$ decoding, the $C_1$ decoded PCM signal, $C_1$ pointer, and parity data Q are read out for each $C_2$ series and subjected to the $C_2$ decoding process in the error correcting circuit 57. The $C_2$ decoding process corrects one or two symbols using the error correction code $C_2$ and erase corrects using the $C_1$ pointer. The PCM signal which was error corrected by the $C_2$ decoding and the $C_2$ pointer are written into the buffer RAM 56. In this $C_2$ decoding, the necessary read address and write address are formed by the address producing circuit 61.

The PCM signals which were subjected to the $C_1$ and $C_2$ decoding processes are read out of the buffer RAM 56 in accordance with the original order. The error pointer indicative of the word whose errors cannot be corrected is read out of the buffer RAM 56 for every such word. In this case, the stereophonic signals of two channels are formed by the PCM signals which had been reproduced from the tracks $T_A$ and $T_B$ of the interleave pair and whose errors were corrected. In order to read out the error corrected PCM signal from the buffer RAM 56, the address formed by the address producing circuit 61 is supplied to the buffer RAM 56. The PCM signal read out of the buffer RAM 56 is supplied to the interpolating circuit 58.

The frame address is detected by a frame address detecting circuit 62 from the PCM-ID in the reproduced data which is obtained from the demodulator 52. The frame address FRAD together with the reproduction block address is supplied to a frame address deciding circuit 63. The PCM-ID or sub code ID ($W_1$), block address ($W_2$), and parity which are obtained from the demodulator 52 are supplied to an error detecting circuit 64. Error detection is performed using a simple parity by the error detecting circuit 64. An error pulse indicative of the presence or absence of errors is generated from the error detecting circuit 64. The error pulse is set to "1" when an error is detected. The error pulse is set to "0" when no error is detected. The error pulse is supplied to the frame address deciding circuit 63 and a counter 65. The counter 65 counts the error pulse which is set to "0" when no error is detected with respect to the reproduced data of one segment.

The count value of the counter 65 is supplied to a number detecting circuit 67, a comparator 68, and a register 66. The count value of the counter 65 with respect to the reproduced data of one segment reproduced by the magnetic head 2A is stored into the register 66. The count value of the counter 65 concerned with the reproduced data of the next segment reproduced by the magnetic head 2B is then compared by the comparator 68 with the count value stored in the register 66. Thus, the comparator 68 generates a comparison output signal of one bit corresponding to the magnitude of the count value. The comparison output signal is supplied to an interpolation control circuit 69.

The number detecting circuit 67 detects whether the count value regarding the reproduced data of one segment reproduced by each of the magnetic heads 2A and 2B is not larger than a predetermined number n or not. For example, n is set to 7. The number detecting circuit 67 generates a detection signal which is set to "1" when the number of error free data is determined to be not larger than n with regard to the reproduced data of both of the magnetic heads 2A and 2B. This detection signal is supplied to the interpolation control circuit 69 which, in turn, generates an interpolation control signal to forcibly set a pointer to the reproduced PCM words from both of the magnetic heads 2A and 2B. Since a number of error pointers are set, the interpolating circuit 58 performs a previous value holding operation or muting operation.

Further, a decision signal NGAB from the frame address deciding circuit 63 and a track identification signal from a terminal 70 are supplied to the interpolation control circuit 69.

As will be explained hereinafter, the frame address deciding circuit 63 generates a decision signal NGTR regarding the frame address in one track and a decision signal NGAB concerned with the frame address of the adjacent track by use of the most significant bit and the least significant bit of the block address which was determined to have no error by the error detecting circuit 64 and by use of the frame address FRAD which was determined to have no error. The decision signal NGTR is set to "1" when different frame addresses are detected in one track. The frame addresses are the same with respect to the PCM signals which are supplied to the magnetic heads 2A and 2B for the period of time corresponding to one rotation of the drum 1 and which form the interleave pair. If different frame addresses are detected in one track, this means that an abnormal reproducing operation has been performed. Such an abnormal reproducing operation could occur when the signal is reproduced by crossing and scanning the other track, for example. The decision signal NGTR is supplied to the error correcting circuit 57. When the decision signal NGTR is set to "1", the execution of an erasing correction using the $C_1$ pointer by the error correcting circuit 57 is inhibited.

The decision signal NGAB is set to "1" when the frame addresses included in the reproduced signals of the magnetic heads 2A and 2B do not coincide. On the basis of the decision signal NGAB, it is detected that the reproduced signals do not constitute an interleave pair.

The decision signal NGAB is supplied to the interpolation control circuit 69. When the decision signal NGAB is set to "1", the magnetic head which generates reproduced data having the least errors detected by the error detecting circuit 64 is indicated by the output of the comparator 68. The reproduced data of the other magnetic head, namely, the reproduced data having more errors, is then interpolated using the reproduced data which has less errors.

Figure 9:
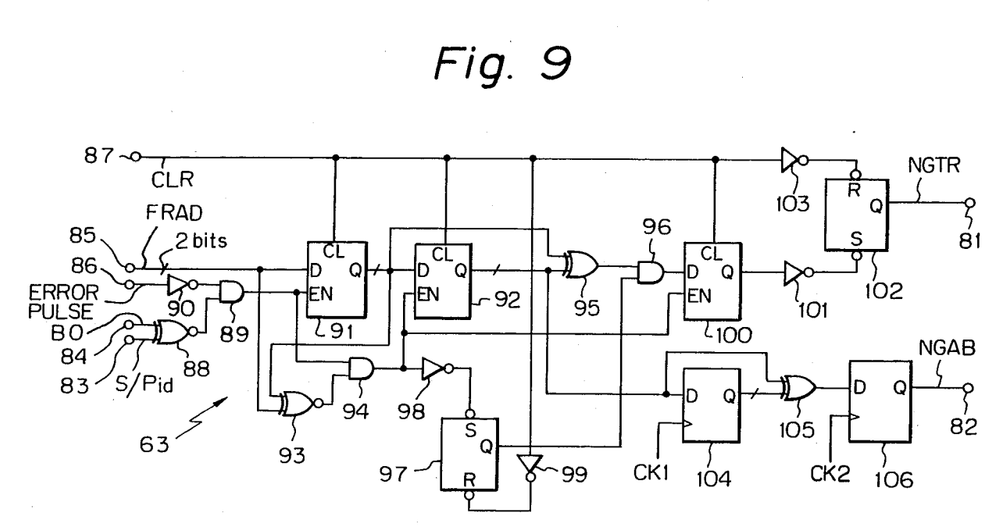
FIG. 9 is a connection diagram showing a constitution of a frame address deciding circuit.

The interpolation control circuit 69 generates an interpolation control signal which is supplied to the interpolating circuit 58. The interpolating circuit 58 performs a mean value interpolating process using the words before and after the error word, a previous value holding process using the preceding word, or the like with respect to the words of the PCM signal which cannot be error corrected and which are specified by the error pointers in the error corrected PCM signal. The interpolating operation is forcibly executed with regard to the PCM signal such that the interpolation control signal from the interpolation control circuit 69 is set to, e.g., "1".

e. Frame address deciding circuit:

FIG. 9 shows a constitution of an example of the frame address deciding circuit 63. The frame address deciding circuit 63 generates the decision signal NGAB to an output terminal 82. The decision signal NGAB indicates whether the frame addresses which are reproduced by the magnetic heads 2A and 2B coincide or not with respect to the track A which is scanned by the magnetic head 2A and the track B which is scanned by the magnetic head 2B. In addition, the deciding circuit 63 generates the decision signal NGTR to an output terminal 81. The decision signal NGTR indicates whether the frame addresses in one track coinoide or not.

The PCM-ID ($W_1$) of the PCM block (refer to FIG. 3B) is repeatedly written at a period of eight blocks. Therefore, the same PCM-ID is recorded (128/8=16) times in one segment. The block address ($W_2$), however, sequentially changes such as (06) to (7F). The ID signal and the optional code can be discriminated by the least significant bit $B_0$ of the block address. The PCM-ID of the block address ($B_0$="0") is the normalized ID signal. The $ID_1$ to $ID_8$ and the frame address (four bits) are included in the block address. Further, the frame address is a code signal which sequentially changes from (0000) to (1111). The frame addresses of the interleave pair have the same code. The interleave pair can be discriminated in the block address detect circuit 60 by the lower two bits of the frame address FRAD. The PCM block (S/Pid signal: "0") and the sub code block (S/Pid signal: "1") are discriminated by the most significant bit (S/Pid signal) of the block address.

The S/Pid signal is supplied from the block address detect circuit 60 to an input terminal 83 of EX-NOR (exclusive NOR) gate 88 and the least significant bit $B_0$ of the block address is supplied to the input terminal 84 of the EX-NOR (exclusive NOR) gate 88. Therefore, the output signal of the EX-NOR gate 88 is the PCM block and is set to "1" in the case of the block of the normalized PCM-ID. The output signal of the EX-NOR gate 88 is supplied to one input terminal of an AND gate 89. The erro pulse which was inverted by an invertor 90 is supplied to the other input terminal of an AND gate 89. Since the error pulse is set to "0" when no error is detected, a high level output signal is derived from the AND gate 89 when it is determined that no error is detected. The output signal of the AND gate 89 is supplied to an enable terminal of a flip-flop 91.

The lower two bits (simply referred to as the frame address) of the frame address FRAD are supplied to the flip-flop 91. Therefore, only frame addresses FRAD of PCM-IDs which are determined to have no error are loaded into the flip-flop 91. The output of the flip-flop 91 is supplied to a flip-flop 92. The frame address FRAD from an input terminal 85 and the frame address from the flip-flop 91 are supplied to one input terminal of an EX-NOR gate 93. Although not shown, clock pulses are supplied to the flip-flops 91 and 92 on a block period unit basis. The output of the EX-NOR gate 93 is supplied to one input terminal of an AND gate 94. The output signal of the AND gate 89 is supplied to the other input terminal of the AND gate 94. The output signal of the AND gate 94 is supplied to an enable terminal of the flip-flop 92. Therefore, the same frame address which was determined to have no error is stored into the flip-flops 91 and 92.

The two-bit frame addresses stored in the flip-flops 91 and 92 are supplied to separate input terminals of an EX-OR (exclusive OR) gate 95. The output signal of the EX-OR gate 95 is supplied to one input terminal of an AND gate 96. The output signal of an RS flip-flop 97 is supplied to the other input terminal of the AND gate 96. The output signal of the AND gate 94 is inverted by an invertor 98. The RS flip-flop 97 is set by the inverted output from the invertor 98. The clear pulse CLR from an input terminal 87 is inverted by an invertor 99. The RS flip-flop 97 is reset by the inverted clear pulse CLR from the invertor 99.

Figures 10A, 10B, 10C, 10D:
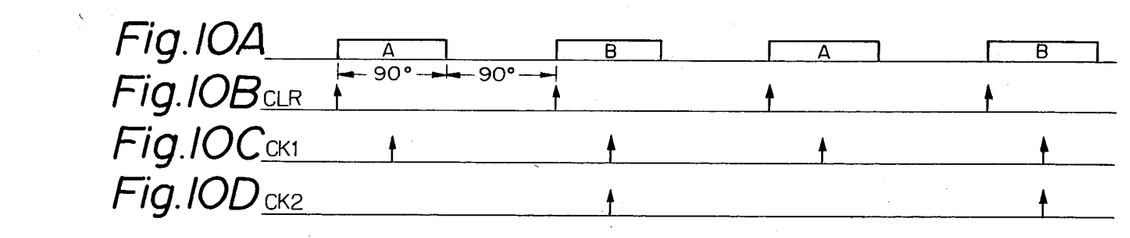
FIG. 10A to 10D are time charts for explaining the operation of the frame address deciding circuit in FIG. 9.

The clear pulse CLR is derived at each of the leading edges of the timing pulses (refer to FIGS. 10A and 10B) during the period of time corresponding to the rotational angle of 90° at which either of the outputs A and B of the magnetic heads 2A and 2B (refer to FIG. 7A) is alternately obtained. Therefore, the output of the RS flip-flop 97 is set to "1" when the frame address FRAD which was determined to have no error coincides twice. The output of the RS flip-flop 97 is supplied to the other input of the AND gate 96. The output signal of the EX-OR gate 95 is set to "1" when two frame addresses FRAD do not coincide. Therefore, the output signal of the AND gate 96 is set to "1" when two frame addresses do not coincide. The output signal of the AND gate 96 is stored into a flip-flop 100.

The output signal of the flip-flop 100 is inverted by an invertor 101. An RS flip-flop 102 is set by the inverted output signal from the invertor 101. The clear pulse CLR from the input terminal 87 is inverted by an invertor 103. The RS flip-flop 102 is reset by the inverted clear pulse CLR from the invertor 103. The output signal of the RS flip-flop 102 is taken out as the decision signal NGTR to the output terminal 81. The decision signal NGTR is set to "1" when the frame addresses do not coincide in one track.

A flip-flop 104, an EX-OR gate 105, and a flip-flop 106 are provided in order to produce the decision signal NGAB. A clock pulse $CK_1$ shown in FIG. 7C, and a clock pulse $CK_2$ shown in FIG. 7D, are supplied to the flip-flops 104 and 106, respectively. The output signal of the flip-flop 92 is supplied to the flip-flop 104 in response to the clock pulse $CK_1$ and is supplied to one input terminal of the EX-OR gate 105. The output of the flip-flop 104 is supplied to the other input terminal of the EX-OR gate 105.

As shown in FIG. 7C, the clock pulse $CK_1$ is used to store the frame addresses FRAD (stored in the flip-flop 92) which were detected from the reproduced signals of the magnetic heads 2A and 2B stored in the flip-flop 104. The EX-OR gate 105 determines whether the frame address detected from the reproduced signal of the magnetic head 2A coincides with the frame address detected from the reproduced signal of the other magnetic head 2B or not. The output signal of the EX-0R gate 105 is set to "0" when both of those frame addresses coincide. This output signal is set to "1" when both of the frame addresses do not coincide. The output signal of the EX-OR gate 105 is supplied to the flip-flop 106 in response to the clock pulse $CK_2$ (FIG. 7D). The output signal of the flip-flop 106 is taken out as the decision signal NGAB to the output terminal 82.

f. Control of the interpolating operation and error correcting operation:

In the foregoing embodiment of the invention, the interpolating circuit 58 ordinarily performs the interpolating operation using the error pointers in association with the respective words of the PCM signal from the error correcting circuit 57. In addition to the ordinary interpolating operation, the interpolating operation is forcibly executed irrespective of the error pointer from the error correcting circuit 57 on the basis of the iterpolation control signal which is generated from the interpolation control circuit 69. The reproducing state when such a forced interpolating operation is executed will now be described with reference to FIG. 11.

Figure 11A:
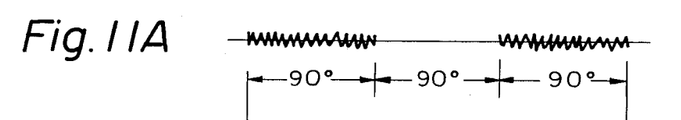
FIGS. 11A to 11C are waveform diagrams of a reproduced signal for explaining the invention.

FIG. 11 shows examples of the reproduced signals of the magnetic heads 2A and 2B. FIG. IIA, shows the case where both of the amplitudes of the reproduced signals of the magnetic heads 2A and 2B decrease. Fr example, the azimuth in the reproducing mode differs from that in the recording mode and the amplitudes of the reproduced signals decrease due to the azimuth loss, or the amplitudes of the reproduced signals decrease because the signals were reproduced from the area in which no signal is recorded. In this case the number of times when it is determined by the error detecting circuit 64 that there is no error decreases to n or less. Further, the foregoing number of times in which an error is detected becomes n or less with respect to each of the reproduced signals of the magnetic heads 2A and 2B, so that the output of the number detecting circuit 67 is set to "1". Therefore, the interpolation control circuit 69 generates an interpolation control signal to forcibly set the error pointers with regard to both of the reproduced signals of the magnetic heads 2A and 2B. Since many pointers are set, the interpolating circuit 58 performs a previous value holding operation or a muting operation.

Figure 11B:
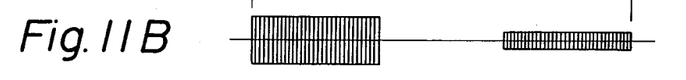

FIG. IIB shows the case where the amplitude of the reproduced signal of the magnetic head 2A is normal and the amplitude of the reproduced signal of the other magnetic head 2B is small. For example, when a connection recording (namely, this means the edition and recording in the assemble mode) is performed by an apparatus having a clogged magnetic head, a reproduced signal as shown in FIG. IIB is generated. The reproduced signal of the magnetic head 2B includes many errors, so that the quality of the corrected PCM signal is bad. In the case of a connection recording, the frame addresses in two adjacent tracks differ. Therefore, the decision signal NGAB which is generated from the frame address deciding circuit 63 is set to "1". In the comparator 68, the reproduced data having less errors between the reproduced data from two adjacent tracks is detected.

When the decision signal NGAB is set to "1", the comparison output signal of the comparator 68 is set to "1". Thus, the interpolation control circuit 69 forms an interpolation control signal to interpolate the reproduced data having more errors using the reproduced data having less errors. When the series of PCM signals which are supplied to the interpolating circuit 58 are expressed by ($L_0, R_0, L_1, R_1, L_2, R_2, L_3, R_3, L_4, \ldots$), the PCM signals of ($L_0, R_1, L_2, R_3, L_4, \ldots$) are reproduced by the magnetic head 2A. The PCM signals of ($R_0, L_1, R_2, L_3, \ldots$) are reproduced by the magnetic head 2B. The track identification signal which is supplied from the input terminal 70 to the interpolation control circuit 69 is a pulse signal which is set to "0" for the period of time during which the PCM signal is reproduced by the magnetic head 2A, while this pulse signal is set to "1" for the period of time during which the PCM signal is reproduced by the magnetic head 2B. On the basis of the track identification signal and the comparison output signal of the comparator 68, the interpolation control circuit 69 generates an interpolation control signal which is set to "1" in correspondence to the period of time that the PCM signal is reproduced by the magnetic head. The error pointer is set to the PCM signal which is reproduced for the period of time when the interpolation control signal is set to "1". Therefore, by using the PCM signal having fewer errors which is reproduced by one magnetic head, the interpolating circuit 58 interpolates the PCM signal reproduced by the other magnetic head.

Figure 11C:
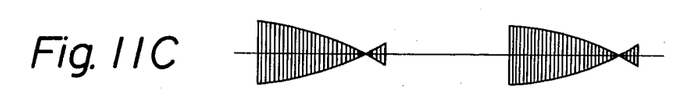

FIG. IIC shows the reproduced signals of the magnetic heads 2A and 2B when the magnetic heads 2A and 2B scanned the other tracks from the middle portions thereof since the tracks are curved. Different frame addresses are reproduced then in one track, so that the decision signal NGTR is set to "1". The decision signal NGTR is supplied to the error correcting circuit 57 and the pointer erasing correction in the $C_2$ decoding is inhibited. In the $C_2$ decoding, one or two error symbols are corrected using the error correction code $C_2$ and at the same time, the erasing correction is performed using the $C_1$ pointer produced by the $C_1$ decoding. However, when the magnetic head scans two tracks as mentioned above, the code words cannot be fundamentally derived in terms of the $C_2$ code series, so that the erasing correction in the $C_2$ decoding using the $C_1$ error pointer is inhibited by the decision signal NGTR.

By controlling the interpolating operation and error correcting operation as mentioned above, the occurrence of annoying, abnormal sound in the reproduced sound is prevented with certainty.

The present invention can be also applied to data of the type in which errors of the PCM-ID of the recording data can be detected by a CRC code other than simple parity.

According to the present invention, the decoding state of the additional codes is used in addition to the result of the decoding of the error correction codes to the PCM signal. Therefore, the amplitude of the reproduced signal is reduced. Even if erroneous decoding is performed by the error correction code, the occurrence of abnormal reproduced sound can be prevented with certainty.

Although the present invention has been shown and described with respect to preferred embodiments, various changes and modifications which are obvious to a person skilled in the art to which the invention pertains are deemed to lie within the spirit and scope of the invention.

What is claimed is:

1. An apparatus for reproducing a digital signal in which continous blocks of input data are supplied to said apparatus and each of said blocks consists of a PCM signal which was error correction coded and additional codes which were subjected to an error correction or detection coding process, said apparatus comprising:
   means for error correcting each of said input data blocks using the error correction code and outputting error corrected data;
   decoding means for decoding the additional codes using the error detection code or the error correction code;
   interpolating means, which is supplied with output data of said error correcting means, for interpolation with respect to error corrected PCM data whose errors cannot be corrected and also with respect to error corrected PCM data designated by a pointer; and
   deciding means, which operates independently of the result of the correction by said error correcting means, for setting an error pointer to the error corrected PCM data which is supplied to said interpolating circuit in accordance wit the decoding state of said coding means.

2. A digital signal reproducing apparatus according to claim 1, wherein said PCM signal is derived from signals recorded in tracks formed on a tape-shaped recording medium, and said apparatus further comprises first and second heads for alterntely reproducing the signal recorded on said recording medium, said deciding means includes comparing means for comparing the decoding state of said decoding means with respect to the signal reproduced by said first head with the decoding state of the decoding means with regard to the signal repreoduced by said second head, and said deciding means sets error pointers to the da a reproduced by one of said first and second heads, after said data has been error corrected by the error correcting means, on the basis of the output of said comparing means.

3. A digital signal reproducing apparatus according to claim 2, wherein said first and second heads are rotary heads.

4. A digital signal reproducing apparatus according to claim 3, wherein the deciding means further comprises detecting means for detecting the number of errors during the scanning operations of said first and second heads and counting means for counting the number of errors which are detected during one scanning operation of each of the first and second heads, and said comparing means compares the count values which are obtained from said counting means with respect to the first and second heads.

5. A digital signal reproducing apparatus according to claim 2, further having drive means for selectively moving said recording medium upon playback at the same or a different speed with respect to the recording speed, and wherein said deciding means is made operative when said drive means moves the recording medium at a playback speed different from the speed upon recording.

6. A digital signal reproducing apparatus according to claim 3, wherein a frame address which increases with each rotation of said head is included with each block of said input data, and said apparatus further comprises detecting means for detecting the frame addresses and frame address discriminating means for comparing said detected frame addresses for the blocks of data reproduced during the period of time when the scanning operation by each head is being executed.

7. A digital signal reproducing apparatus according to claim 6, wherein the error correcting means performs an erasing correction and wherein the erasing correction is inhibited in said error correcting means on the basis of the output of said frame address dscriminating means when a data block having a frame address different from the other frame addresses which are detected during one scanning operation of the head is reproduced.

* * * * *